United States Patent
Chandra et al.

(10) Patent No.: US 8,543,143 B2
(45) Date of Patent: Sep. 24, 2013

(54) METHOD AND APPARATUS FOR GROUPING POINTS-OF-INTEREST ACCORDING TO AREA NAMES

(75) Inventors: Umesh Chandra, Sunnyvale, CA (US); Juong-Sik Lee, Menlo Park, CA (US); Deepti Chafekar, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 520 days.

(21) Appl. No.: 12/646,158

(22) Filed: Dec. 23, 2009

(65) Prior Publication Data
US 2011/0151898 A1    Jun. 23, 2011

(51) Int. Cl.
*H04W 4/00*  (2009.01)

(52) U.S. Cl.
USPC ............ 455/466; 455/456.3; 455/456.1; 455/456.5; 455/457

(58) Field of Classification Search
USPC ............ 455/466, 456.1, 456.3, 456.5, 457; 340/490; 701/211
See application file for complete search history.

(56) References Cited

U.S. PATENT DOCUMENTS

| | | | |
|---|---|---|---|
| 6,052,597 | A | 4/2000 | Ekstrom |
| 6,529,143 | B2 | 3/2003 | Mikkola et al. |
| 6,622,082 | B1 | 9/2003 | Schmidt et al. |
| 6,882,935 | B2 | 4/2005 | Chun |
| 7,076,505 | B2 * | 7/2006 | Campbell ............ 340/990 |
| 2004/0203863 | A1 * | 10/2004 | Huomo ............ 455/456.1 |
| 2006/0058041 | A1 | 3/2006 | Cheng |
| 2006/0252434 | A1 | 11/2006 | Lin |
| 2006/0286987 | A1 | 12/2006 | Ryu et al. |
| 2007/0276597 | A1 * | 11/2007 | Kato et al. ............ 701/211 |
| 2007/0281690 | A1 | 12/2007 | Altman et al. |
| 2009/0005083 | A1 | 1/2009 | Hoshino et al. |
| 2009/0281722 | A1 | 11/2009 | Bitonti et al. |
| 2010/0010737 | A1 | 1/2010 | Pyo |
| 2010/0120449 | A1 | 5/2010 | Jakorinne et al. |

FOREIGN PATENT DOCUMENTS

| | | | |
|---|---|---|---|
| WO | WO 98/19479 | * | 5/1998 |
| WO | WO 99/12226 A2 | | 3/1999 |

OTHER PUBLICATIONS

Kapoor, V. et al., Building POI LBS and its Indian Market Potential. Accessed Mar. 23, 2010, http://www.gisdevelopment.net/technology/lbs/mwf09_vinit.htm.
Waze. Accessed: Mar. 23, 2010, http://world.waze.com/guided_tour/.
International Search Report for corresponding PCT Application No. PCT/FI2010/050965, Apr. 13, 2011, pp. 1-6.
Written Opinion of the International Searching Authority for corresponding PCT Application No. PCT/FI2010/050965, Apr. 13, 2011, pp. 1-9.

* cited by examiner

*Primary Examiner* — David Q Nguyen
(74) *Attorney, Agent, or Firm* — Ditthavong Mori & Steiner, P.C.

(57) ABSTRACT

An approach is provided for crowd sourcing and grouping points-of-interest based on cell broadcast message information. Reception of a message from a mobile terminal is caused, at least in part. The message specifies point-of-interest information and an associated area name corresponding to one of a plurality of cells of a communication network. The message is parsed to determine the point-of-interest information and the associated area name. A connectivity graph specifying relationships among the cells is selectively updated with the point-of-interest information.

8 Claims, 12 Drawing Sheets

METHOD AND APPARATUS FOR GROUPING POINTS-OF-INTEREST ACCORDING TO AREA NAMES

BACKGROUND

Service providers (e.g., wireless, cellular, etc.) and device manufacturers are continually challenged to deliver value and convenience to consumers by, for example, providing compelling network services. These services may include location based services for points-of-interest. Many location based services rely heavily on global positioning system technology and information over the internet to determine the location of a user to provide the location based services for the points-of-interest. Participation in these location based services by users, however, may be limited because the user may not have access to a device capable of using such technology. Technical difficulties thus arise in providing location based services to users of such devices.

SOME EXAMPLE EMBODIMENTS

Therefore, there is a need for an approach for grouping points-of-interest according to area names.

According to one embodiment, a method comprises causing, at least in part, reception of a message from a mobile terminal. The message specifies point-of-interest information and an associated area name corresponding to one of a plurality of cells of a communication network. The method also comprises parsing the message to determine the point-of-interest information and the associated area name. The method further comprises selectively updating a connectivity graph specifying relationships among the cells with the point-of-interest information.

According to another embodiment, an apparatus comprising at least one processor, and at least one memory including computer program code, the at least one memory and the computer program code configured to, with the at least one processor, cause, at least in part, the apparatus to cause, at least in part, reception of a message from a mobile terminal. The message specifies point-of-interest information and an associated area name corresponding to one of a plurality of cells of a communication network. The apparatus is also caused to parse the message to determine the point-of-interest information and the associated area name. The apparatus is further caused to selectively update a connectivity graph specifying relationships among the cells with the point-of-interest information.

According to another embodiment, a computer-readable storage medium carrying one or more sequences of one or more instructions which, when executed by one or more processors, cause, at least in part, an apparatus to cause, at least in part, reception of a message from a mobile terminal. The message specifies point-of-interest information and an associated area name. The apparatus is also caused to parse the message to determine the point-of-interest information and the associated area name. The apparatus is further caused to selectively update a connectivity graph specifying relationships among the cells with the point-of-interest information.

According to another embodiment, an apparatus comprises means for causing, at least in part, reception of a message from a mobile terminal. The message specifies point-of-interest information and an associated area name corresponding to one of a plurality of cells of a communication network. The apparatus also comprises means for parsing the message to determine the point-of-interest information and the associated area name. The apparatus further comprises means for selectively updating a connectivity graph specifying relationships among the cells with the point-of-interest information.

According to one embodiment, a method comprises generating, at a mobile terminal, point-of-interest information. The method also comprises associating the point-of-interest information with a cell broadcast message identifier corresponding to one of a plurality of cells of a communication network. The cell broadcast message identifier includes an area name. The method further comprises generating a message specifying the point-of-interest information and the area name.

According to another embodiment, an apparatus comprising at least one processor, and at least one memory including computer program code, the at least one memory and the computer program code configured to, with the at least one processor, cause, at least in part, the apparatus to generate, at a mobile terminal, point-of-interest information. The apparatus is also caused to associate the point-of-interest information with a cell broadcast message identifier corresponding to one of a plurality of cells of a communication network. The cell broadcast message identifier includes an area name. The apparatus is further caused to generate a message specifying the point-of-interest information and the area name.

According to another embodiment, a computer-readable storage medium carrying one or more sequences of one or more instructions which, when executed by one or more processors, cause, at least in part, an apparatus to generate, at a mobile terminal, point-of-interest information. The apparatus is also caused to associate the point-of-interest information with a cell broadcast message identifier corresponding to one of a plurality of cells of a communication network. The cell broadcast message identifier includes an area name. The apparatus is further caused to generate a message specifying the point-of-interest information and the area name.

According to another embodiment, an apparatus comprises means for generating, at a mobile terminal, point-of-interest information. The apparatus also comprises means for associating the point-of-interest information with a cell broadcast message identifier corresponding to one of a plurality of cells of a communication network. The cell broadcast message identifier includes an area name. The apparatus further comprises means for generating a message specifying the point-of-interest information and the associated area name.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for associating crowd sourced point-of-interest information with areas of connectivity graphs are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
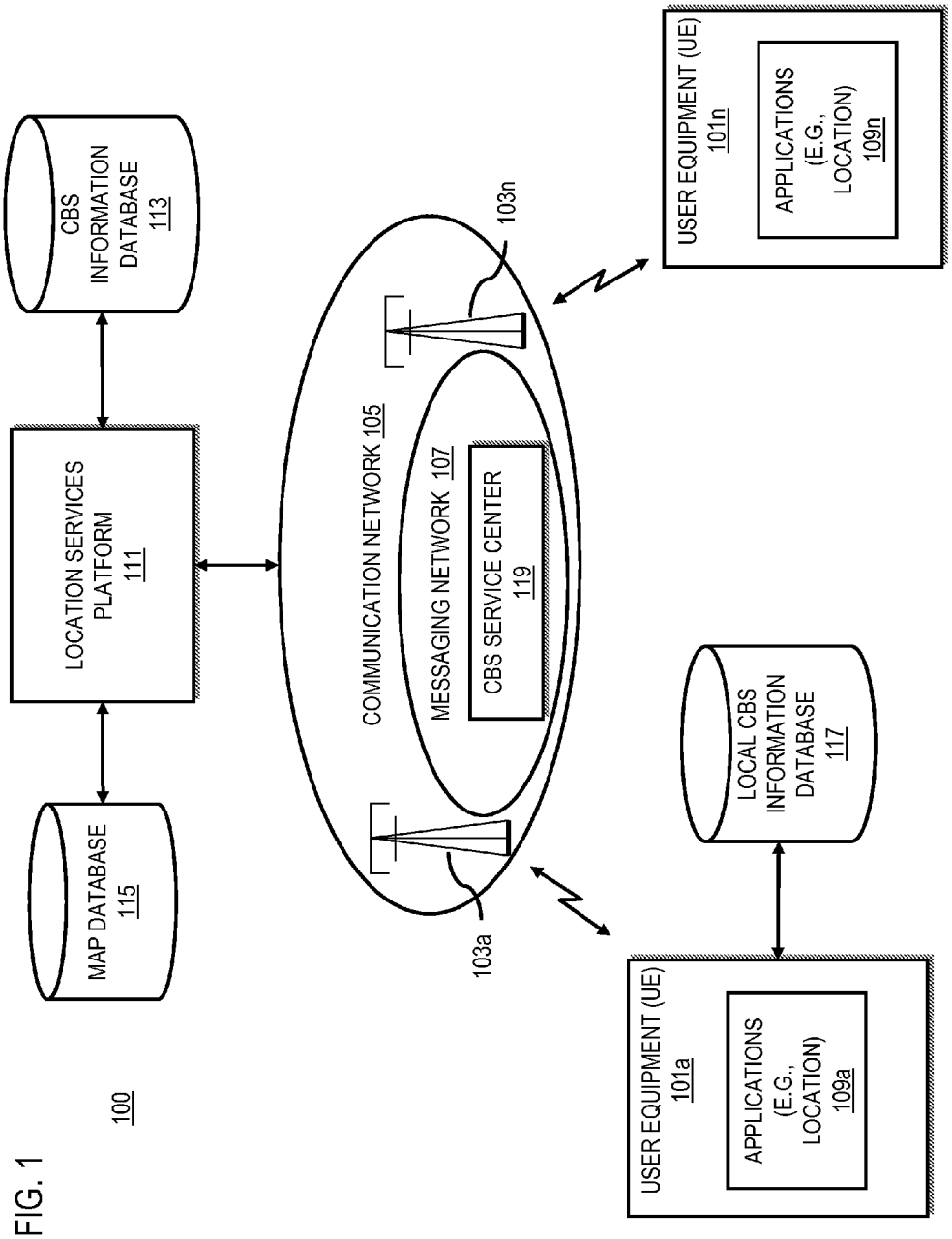
FIG. 1 is a diagram of a system capable of updating point-of-interest information for providing location based services using connectivity graphs based on cell broadcast information, according to one embodiment.

FIG. 1 is a diagram of a system 100 capable of updating point-of-interest information for providing location based services using connectivity graphs based on cell broadcast information, according to one embodiment. In certain embodiments, a connectivity graph is a graph that includes connections between vertexes (e.g., cells of a cellular network). As indicated, the connectivity graph vertexes may be based on cell broadcast information (e.g., cell broadcast identifiers). Examples of connectivity graphs and how connectivity graphs may be produced are included below as well as in FIG. 2. Traditionally, location based services include identifying a location of a user and/or finding local establishments such as restaurants, businesses, and other points-of-interest (POIs) nearby the location. These services may also include discovering locations of other persons, receiving discount coupons and advertisements from nearby POIs, receiving traffic and weather updates, finding routes and directions, etc. Many of these services generally rely on a global positioning system (GPS) or other location information such as cell identifiers (CellID) implemented in, for instance, user equipment (UE 101a-101n). However, some users may not wish to utilize the GPS technology for one or more reasons such as cost, power consumption, availability, etc. In some cases, the technology is not available because the UE 101 may not have the capability or because the UE 101 is in an area with poor GPS reception. In some scenarios, the UEs 101 may include the capability to receive CellIDs and utilize cell of origin technology to receive location based services. CellIDs can be mapped to a location based on databases; however, service providers that own cell towers may be unwilling to provide location information of the cell towers 103a-103n, and third party databases of cell tower 103 locations may be incomplete.

Further, in emerging economies, many location based services are unavailable to users because of the aforementioned lack of availability of GPS technology. Moreover, there are a variety of social and cultural barriers for implementing the use of GPS technology in such emerging economies. In certain countries (e.g., India), cities may be divided (officially or unofficially) into one or more areas. For example, in the city of Banglore, the one or more areas include Indira Nagar, Vijay Nagar, Koramangala, etc. These areas may be used by people in the areas as colloquial reference points (e.g., "I live in Indiara Nagar," "My office is at Mrugespalya," etc.). Moreover, people in the areas may have strong associations with these locations and names. Further, in many of these locations, the street names and street numbers are rarely used in orienting a person or finding directions, thus there may be little use in receiving GPS based instructions to navigate to a location. Instead, these users may be more apt to identify points-of-interest (POIs) based on the areas (e.g., "I am standing next to Bharat stores in Kormanala"). Thus, sophisticated GPS based services that provide point-to-point navigational directions and search information (e.g., Find restaurants within 5 miles of an address) may not be culturally adoptable. Moreover, in emerging economies, information about many POIs has not been collected and stored to provide location based services. Additionally, POIs associated with the areas may need to be dynamically updated to allow for up-to-date POI location based services.

To address this problem, a system 100 of FIG. 1 introduces the capability to provide location based services for POIs associated with connectivity graphs based on cell broadcast information. As such, areas associated with the connectivity graphs may be associated with local areas (e.g., Indira Nagar). The cell broadcast information from a cell broadcast service (CBS) can be collected by UEs 101 that may receive CBS messages from cellular towers 103, such as base stations, that are part of a communication network 105. The cell towers 103 may also be a part of a messaging network 107 that can be used to send and receive messages to and from UEs 101. An application 109, such as a location application 109 can be used to collect CBS message information and CellID information. The location application 109 can then send CBS message information and CellID information to a location services platform 111 via the messaging network 107 and/or the communication network 105. The CBS message information and CellID information may then be stored in a CBS information database 113. A lookup table can be constructed mapping the CellIDs to respective CBS location information. The location services platform 111 may determine the relationships between cell tower cells, which can have CellIDs, associated with the CBS message information. These relationships can be used to construct a connectivity graph that can be stored in the CBS information database 113. Moreover, the CBS message information can be associated with a map database 115 that can include information about locations and POIs. The map database 115 can be associated with the CBS information database 113 by correlating information about cells of the CBS information database 113 to geographical areas of the map database 115. Additionally or alternatively, the connectivity graph may include information about the POIs and locations. These databases can be used in conjunction with the location services platform 111 to provide location based services to UEs 101.

Further, the map database 115 and CBS information database 113 may be updated to include new or updated information about POIs. POI information for a POI may be collected from a UE 101. The POI information may be associated with CBS message information associated with the POI. In certain scenarios, the POI information may be entered into the UE 101 using a user interface as detailed in FIG. 10. As such, according to certain embodiments, POI information includes a category of POI (e.g., transportation, eat and drink, sightseeing and museums, accommodation, shopping, etc.), subcategories of the categories (e.g., accommodation may include hotels, motels, hostels, camping, etc.), POI contact information (e.g., name, address, city, phone number, etc.), or other like information about a POI. Moreover, the POI information may additionally include landmarks and other POIs that are nearby to the POI and can be used for guidance (e.g., POI information about a restaurant in Vijay Nagar may indicate that it is next to a cinema). The UE 101 may transmit the POI information and associated CBS message information to the location services platform 111 via the communication network 105 to update the CBS information database 113. In certain scenarios, the messaging network 107 is utilized to transmit Short Message Service (SMS) messages or Multimedia Messaging Service (MMS) messages to the location services platform 111. In other scenarios, the UE 101 includes a local CBS information database 117 that includes the connectivity graph or a version of the connectivity graph. Further, the CBS message information may include an area name associated with the CBS message. This area name may be an identifier that is associated with the connectivity graph. In this manner, a POI may be linked to areas in the connectivity graph based on the area names associated with the POI.

Further, the local CBS information database 117 may be updated to include updated information (e.g., POI information collected from other UEs) from the CBS information database 113. The location application 109 may send a request to the location services platform 111 for additional POI information associated with an area. This area may be selected based on a current location of the UE 101 or a user input. The area may be associated with one or more area names. The location services platform 111 may determine POIs associated with the area from the CBS information database 113. The location services platform 111 may store an identifier for each POI in the CBS information database 113 associated with a timestamp of the last update of the POI information for that POI. Thus, the CBS information database 113, according to one embodiment, may include for each area an area name, area connectivity information as further detailed below, and POI information for POIs in the area. The POI information may include a timestamp of when the POI information for a POI was updated. The local CBS information may further include a timestamp of the last time the area information was updated. Further, the request may include the local area information timestamp. In this manner, the location services platform 111 can selectively retrieve POI information for the area that the UE 101 does not have updated information. Then, the location services platform 111 sends a message containing the update information to the UE 101. The location application 109 then updates the local CBS information database 117 based on the update information. In certain scenarios, the transmissions between the UE 101 and location services platform 111 may be SMS or MMS messages. These messages can increase the amount of UEs 101 available to access the location services platform 111 because most mobile UEs 101 include such functionality.

As shown in FIG. 1, the system 100 comprises the UE 101 having connectivity to the location services platform 111, other UEs 101, and a message services center (MSC) via a communication network 105. By way of example, the communication network 105 of system 100 includes one or more networks such as a data network (not shown), a wireless network (not shown), a telephony network (not shown), a messaging network 107 or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like. Moreover, the messaging network 107 can provide, according to certain embodiments, services such as email, instant messaging (IM), SMS messaging (e.g., text messaging), MMS messaging, CBS messaging, or other messaging communication. Moreover, messaging may be executed using an Unstructured Supplementary Service Data (USSD). As such, messages may include real-time services and/or instant messaging. USSD may be utilized as a trigger to invoke independent calling services that need not require the overhead of SMS messaging or MMS messaging.

As noted, the messaging network 107 can provide for SMS messaging, MMS messaging capabilities, or CBS messaging. The messaging network 107 may be a part of a telephony network (e.g., a cellular network). As part of a cellular network, UE 101 can communicate with a cellular tower 103 to send and receive data including SMS messaging and MMS messaging. Cellular towers 103 communicate with a UE 101 via control channels so that the UE 101 is able to ascertain which cellular tower 103 to connect to. A control channel can also be utilized to deliver messages. A message can be sent to a UE 101 via a cellular tower 103 and a MSC. The MSC can be used as a medium between the cellular network and internet protocol networks designed to carry messaging traffic. The message can have information about the message and the destination such as the length of the message, a time stamp, the destination phone number, etc., which can be used to route the message to the destination. In one example, location services platform 111 can send a message to the UE 101 via the messaging network 107 by sending the message to the MSC via an internet protocol network. Then, the MSC can deliver the message to the UE 101 via the cellular tower control channel.

Moreover, the cellular network may also include CBS messaging capabilities. Network service operators may use a CBS service center 119 to send a cell broadcast to communicate information such as an area code for a cell tower 103 to a UE 101, provide nationwide, citywide, or other area wide alerting (e.g., for emergencies), weather reports, mass messaging, location based news, traffic news, advertisements, area names, etc. CBS messages can be periodically sent from the cell tower 103 to the UEs 101 within range of the cell tower 103. Moreover, CBS messages can be sent via multiple cell towers 103. As such, a network service operator need not ascertain the mobile number of each UE 101 in its area or adjust its throughput (e.g., the number of messages to send per second). CBS messages may be sent on different channels and the UE 101 can choose to tune into certain channels to receive the information. Some network service operators broadcast area information in a textual format that is human comprehensible (e.g., comprehensible area name such as "Pennsylvania Avenue," "Georgetown," "Vijay Nagar," etc.) to the general population on certain channels (e.g., channel 50 or channel 51). Different service operators may send area information or other information using different channels. Further, different operators may transmit area information (e.g., CBS names) and the area information may be slightly different than other operators transmitting the area information from the same cell tower 103. This information can be transmitted to the location services platform 111, which may merge information collected from different operators. Moreover, a cell tower 103 broadcasting a CBS message can transmit area information associated with the cell tower 103.

In one embodiment, UEs 101 may collect CBS message information by listening to one or more CBS message channels and CellID information from a GSM control channel. A location application 109 of one of the UEs 101 may be associated with a location services platform 111 (e.g., via registration). The location application 109 may then be used to determine location and related information. For example, the location application 109 captures the CBS message and extracts CBS message identifier information (e.g., area name, location, etc.), from the CBS message. In addition or alternatively, the location application 109 may determine other information available to the UEs 101 such as date, time, and optional information such as latitude, longitude, altitude etc. (e.g., via GPS) and store the information in a memory. In one embodiment, the location application 109 can determine CellID information associated with the CBS message based on the fact the UE 101 has information relating to which cell the UE 101 is connected to while receiving the CBS message. According to some embodiments, a CBS message identifier or a cell broadcast message identifier includes textual information about an area associated with a cell tower 103. Examples of CBS message identifiers include an area name, a location, a landmark, or other like descriptive area information.

Under some scenarios, the UE 101 may not be capable of capturing a CBS message, but is able to capture CellID information. In this case, the UE 101 can extract date, time, and CellID information from a connection to the cell tower 103. In other scenarios, the UE 101 may be capable of retrieving GPS coordinates of the user. Under this scenario, the UE 101 may add the GPS coordinate information to the data set associated with the extracted information. This extracted information can then be sent to the location services platform 111 for analysis. Additionally or alternatively, one or more data sets can be transmitted from the UE 101 to the location services platform 111 at a time. The transmission can be via SMS, GPRS, MMS, over an internet protocol, or the like. Additionally, the data collection and transmission can be based on a time period (e.g., collect information every second, transmit the information every ten seconds, collect and transmit information every 5 seconds etc.) or based on an event (e.g., collect a data set when the CellID changes or changes for at least a certain threshold time period or when CBS area information (e.g., a CBS name) changes or changes for at least a certain threshold time period). Additionally or alternatively, the entire CBS message may be sent to the location services platform 111 and the location services platform 111 may extract information from the message.

The location services platform 111 can collect location information including CBS message identifier information, CellID information, timing information, date information, GPS information, a combination thereof, or the like from a plurality of UEs 101 via crowd-sourcing. CellID information associated with the CBS message can be determined by capturing the CellID of the cell tower 103 that the UE 101 is connected to when receiving the CBS message. With this crowd-sourcing, the system 100 can become more accurate as more information is gathered from UEs 101. In certain embodiments, CBS message identifier information may include area information in a textual format that is comprehensible to the general population. Examples of CBS message identifier information can include a name of a street associated with an area a cell tower 103 transmitting the CBS message, an area associated with the cell tower 103 location, landmarks associated with the cell tower 103 location or other information associating the cell tower 103 to locations.

In one scenario, different operators controlling CBS broadcasts transmitted from the same cell tower 103 can send area information that may have a slightly different spelling or annotation. For example, one operator may transmit "Pennsylvania Avenue" as area information while another operator may transmit "Pennsylvania Ave." A name matching technique can be used to determine if the two area names refer to the same area. Additionally or alternatively, collected GPS information may be used to determine if the two area names refer to the same area by correlating and analyzing GPS information of UEs 101 associated with the two area names. The CBS message identifier information can be associated with the CellID information and stored in the CBS information database 113. The CBS information database 113 can thus include a data structure that maps CBS message identifier information to CellIDs. Moreover, captured CBS message identifier information, CellID information, and timing information can be used to construct a connectivity graph. For example, two cells are connected as neighbors if a UE 101 transmits information is analyzed to determine that the UE 101 was in area A and then moved into area B from area A. Data from the plurality of UEs 101 may be used to determine the connectivity of cells. Further, as noted above, the location services platform 111 may associate POIs with the areas in the CBS information database 113.

Moreover, GPS information collected can also be associated with the cells and the connectivity graph to determine an area of coverage of the cells. Further, the GPS coordinates may be aggregated to determine a centroid or geometric center of the area of the cell. An estimated centroid may be determined by taking a mean of the GPS coordinates associated with the cell. Additionally, the centroid locations can be used to determine estimated distances from one cell to another. This information can be added to the connectivity graph to determine a proximity graph that includes distance values associated with each edge, that is each pair of connected cells.

Additionally or alternatively, the location services platform 111 can associate the cells with POIs and maps in a map database 115. One method of making this determination is to map the cell to a map using the GPS coordinates or other location coordinates of the centroid. Another method is to determine a coverage area of the cell using GPS coordinates or other location coordinates. Further, POIs can be associated with GPS coordinates or other location coordinates that can be used to associate the POIs with the coverage areas of the cells.

Additionally, the location services platform 111 can provide location based services to UEs 101. The location services platform 111 can receive location based queries from UEs 101. The location services platform 111 can then determine a response to the query based on the map database 115 and the CBS information database 113. In one example, query includes a request for the location services platform 111 to determine directions to a destination location based on a current location that is represented by a CBS message identifier or a CellID. A cell can be associated with the destination location (e.g., a POI) using the map database 115. Then, the location services platform 111 can then determine a path from the current location to the destination location using the connectivity graph or the proximity graph. The connectivity graph can provide one or more routes through cells to the destination location. The proximity graph can be used to determine a shortest path determined using the distances between connected cells. The CBS message identifiers (e.g., an area name) associated with the cells along the path can then be transmitted to the UE 101, which can render a presentation of the information to a user.

Further, in one embodiment, the location based services can be performed on the UE 101 using the location application 109 and a location CBS information database 117. The CBS information database 117 can include textual information associated with the connectivity graph, proximity graph, POIs associated with areas of the graphs, etc. The textual information can keep the size of the local CBS information database 117 low to allow for the keeping of the information at the UE 101.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, CBS service center 119, and location services platform 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
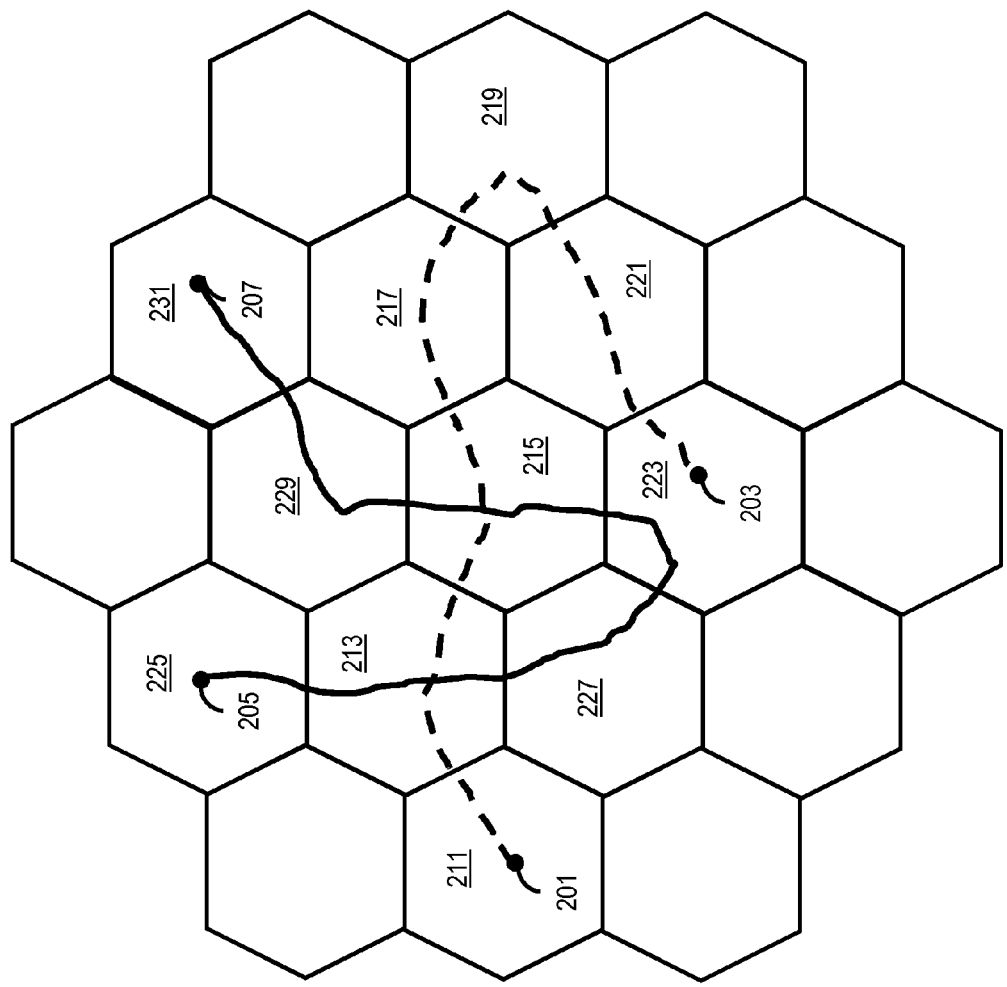
FIG. 2 is a diagram of a group of cells that can be used to illustrate relationships of a connectivity graph, according to one embodiment.

FIG. 2 is a diagram of a group of cells that can be used to illustrate relationships of a connectivity graph, according to one embodiment. The diagram shows the paths of two users, user A from point 201 to point 203 and user B from point 205 to point 207. These paths illustrate the collection of information and analysis used to create a connectivity graph. As mentioned above, in certain embodiments, a connectivity graph is a means of storing data that includes connections between vertexes (e.g., cells of a cellular network). User A travels from cell 211 to cell 213, cell 213 to cell 215, cell 215 to cell 217, cell 217 to cell 219, cell 219 to cell 221, and cell 221 to cell 223. Each of these cells can be associated as neighbors with the cell that user A travel to or from. For example, cell 211 is connected to cell 213, while cell 213 is connected to cell 211 and cell 215. Then the path that user B takes adds more information to the connectivity graph. User B travels from cell 225 to cell 213, cell 213 to cell 227, cell 227 to cell 223, cell 223 to cell 215, cell 215 to cell 229, and cell 229 to cell 231. This adds to the information in the connectivity graph as to which cells are connected. For example, now cell 213 is connected with cell 211, cell 215, cell 225, and cell 227 in the connectivity graph. Using this method, greater cell connections can be determined.

Figure 3:
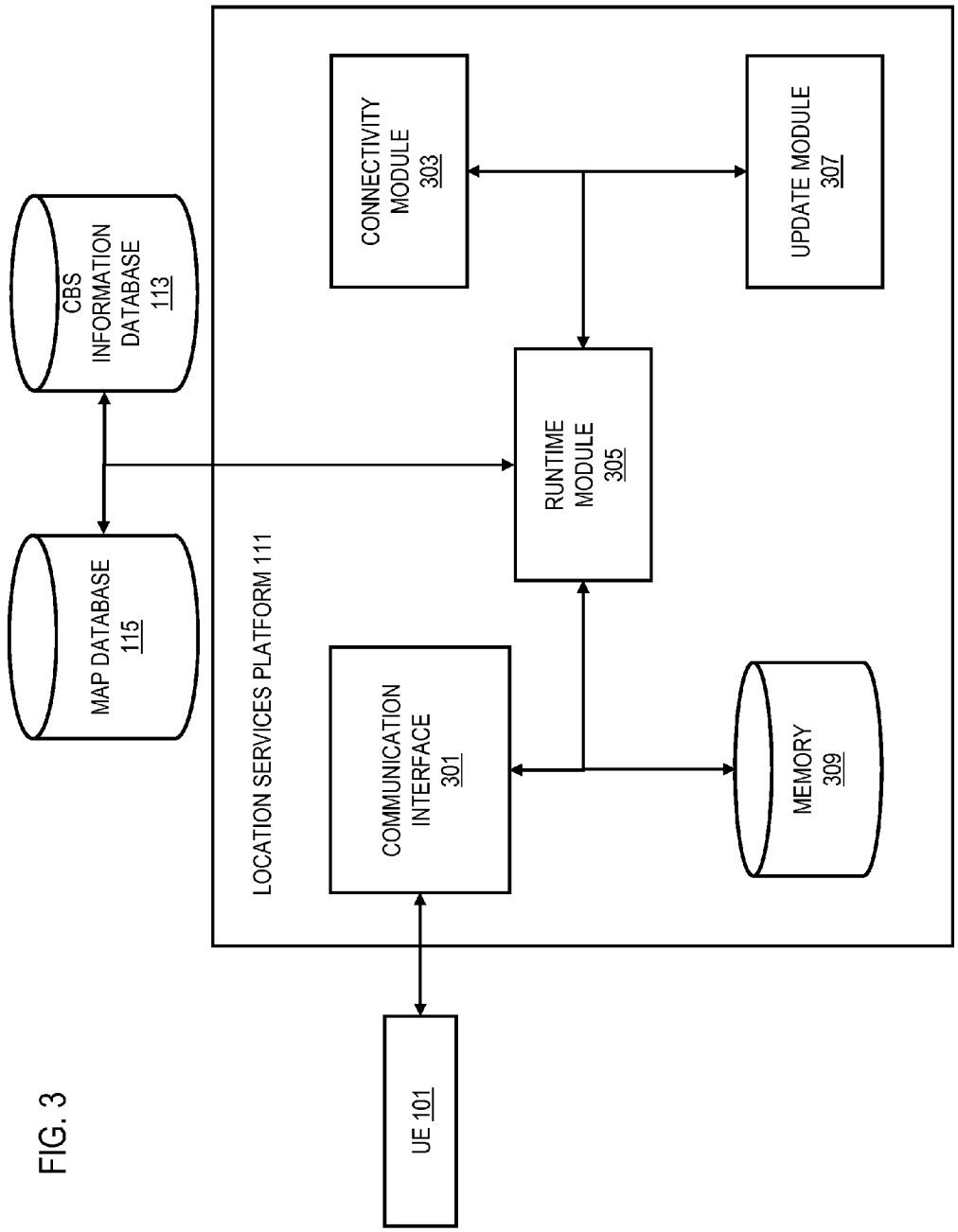
FIG. 3 is a diagram of the components of a location services platform, according to one embodiment.

FIG. 3 is a diagram of the components of a location services platform 111, according to one embodiment. By way of example, the location services platform 111 includes one or more components for providing location based services using up-to-date connectivity graphs associated with POI information based on cell broadcast information. It is contemplated that the functions of these components may be combined in one or more components or performed by other components of equivalent functionality. In this embodiment, the location services platform 111 includes a communication interface 301, a connectivity module 303 that can be used to determine the connectivity of two cells, a runtime module 305 that can execute processes, a update module 307 that can be used to update connectivity graphs in a CBS information database 113 or to select updates to provide to a UE 101, and a memory 309.

In one embodiment, the location services platform 111 includes a communication interface 301. The communication interface 301 can be used to communicate with a UE 101. The location services platform 111 can receive information from the UE 101 via the communication interface 301 via methods such as internet protocol, MMS, SMS, GPRS, or any other available communication method. The UE 101 can send information to the location services platform 111 to populate the CBS information database 113 for connectivity graph information as well as for POI information associated with areas of the connectivity graph. This information can include CBS message identifiers, CellIDs, timing information, date information, GPS information, other location information, or a combination thereof. Moreover, the UE 101 or another UE 101 can send a query to the location services platform 111 to request location based services. The runtime module 305 can receive the query from the communication interface 301 and determine a response answer. The runtime module 305 can then forward the response to the communication interface 301 to transmit to the UE 101. The response can be stored in a memory 309 until ready to be sent.

The connectivity module 303 can be used to process information collected and stored in the CBS information database 113 to determine a connectivity graph or a proximity graph of collected cell information. An example of the process to determine a connectivity graph is provided in the description of FIG. 2. In one embodiment, the connectivity graph can be represented as a proximity graph with an added parameter of a distance between two connected cells. The distance can be determined using GPS coordinates and determined centroids of respective cells as previously described. The connectivity module 303 may also be used to associate cells in the CBS information database 113 with location areas and POIs in the map database 115.

Further, the update module 307 can receive information associated with a POI from a UE 101 to update the connectivity and proximity graphs. The information may be received as a message specifying a CBS message identifier associated with the location of the POI. The message may also specify other POI information. In certain scenarios, a user of the UE 101 can select the POI information. When the update module 307 receives the POI information and CBS message identifier (e.g., an area name), the update module 307 can parse the POI information. Then, the update module 307 can retrieve information associated with a cell in the connectivity graph based on the CBS message identifier from the CBS information database 113. The cell information may include POIs associated with the CBS message identifier. The information about each POI can be parsed and compared with the received POI information to determine if the information received from the UE 101 is new, an update, or old. Then, the update module 307 selectively updates the connectivity graph with the POI information if the POI information is new or an update. Each POI associated with the cell may include an update timestamp or version to track updates.

Moreover, in certain scenarios, the communication interface 301 receives a request for updated POI information associated with an area based on CBS message identifier. Further, this request may include a timestamp of the last update of the area received by the UE 101. The update module 307 can retrieve cell information associated with a cell in a connectivity graph in the CBS information database 113 that includes POI information associated with the cell. Then, the update module 307 can parse the POI information to determine which information has been updated since the last update received by the UE 101. Then, the update module 307 selects the updated POI information and formulates an update message including the update information. Then, the runtime module 305 causes, at least in part, transmission of the update message to the UE 101 via the communication interface 301.

Figure 4:
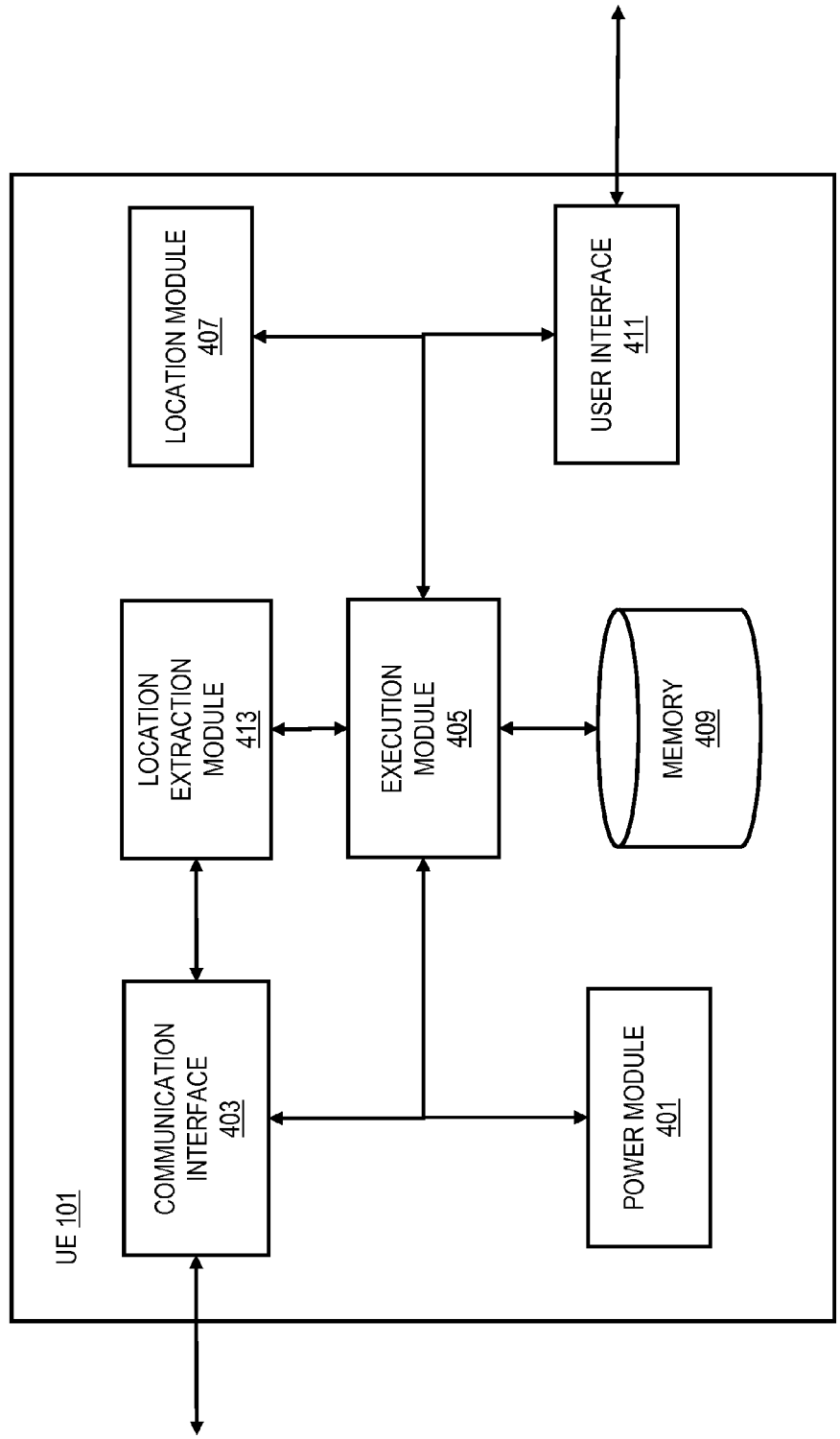
FIG. 4 is a diagram of the components of a user equipment that can collect information to update point-of-interest information, create a connectivity graph, and consume location based services, according to one embodiment.

FIG. 4 is a diagram of the components of a user equipment that can collect information to update point-of-interest information, create a connectivity graph, and consume location based services, according to one embodiment. It is contemplated that the functions of these components may be combined in one or more components or performed by other components of equivalent functionality. In this embodiment, the UE 101 includes a power module 401 to provide power and power controls to the UE 101, a communication interface 403 to communicate over a network, an execution module 405 to control the runtime of applications executing on the UE 101, a location module 407 to determine a current location of the UE 101, a memory 409, a user interface 411 to output and receive input at the UE 101, and a location extraction module 413 to extract CBS information from CBS messages.

In one embodiment, the UE 101 includes a power module 401. The power module 401 provides power to the UE 101. The power module 401 can include any type of power source (e.g., battery, plug-in, etc.). Additionally, the power module 401 can provide power to the components of the UE 101 including processors, memory 409, and transmitters. The power module 401 may additionally power GPS component, which may consume a vast amount of power relative to the rest of the UE 101. In certain embodiments, to extend battery life and save power, the UE 101 may utilize location based services without the use of GPS, instead utilizing connectivity graphs and CBS message identifiers.

The communication interface 403 may include multiple means of communication. For example, the communication interface 403 may be able to communicate over SMS, internet protocol, CBS messaging, or other types of communication. The communication interface 403 can be used by the execution module 405 to communicate with other UEs 101, the location services platform 111, receive CBS messages from cell towers, and other like communications. In some examples, the communication interface 403 is used to transmit information about the location of the UE 101. In other examples, the communication interface 403 is used to send and receive messages associated with POIs. It is noted that although one communication interface 403 is shown, multiple communication interfaces may be utilized depending on the implementation.

In one embodiment, a UE 101 includes a location module 407. This location module 407 can determine a user's location. The user's location can be determined by a triangulation system such as GPS, A-GPS, Cell of Origin, or other location extrapolation technologies. Standard GPS and A-GPS systems can use satellites to pinpoint the location of a UE 101. A Cell of Origin system can be used to determine the cellular tower 103 (e.g., via CellID) that a cellular UE 101 is synchronized with. Moreover, UE 101 may be able to receive a CBS message broadcast from a cellular tower 103. In some embodiments, the UE 101 can have one or more of the location extrapolation technologies. In one example, the UE 101 may use GPS coordinates to associate CellIDs and CBS message identifiers with GPS coordinates to send to a location services platform 111. In another exemplary embodiment, the UE 101 is able to only receive CellID information. The location services platform 111 can determine a mapping of the CellID to determine a CBS message identifier using the CBS information database 113 and map database 115. The location module 407 may also utilize multiple technologies to detect the location of the UE 101. GPS coordinates can provide finer detail as to the location of the UE 101 than other methods.

In one embodiment, the UE 101 includes a location extraction module 413. The location extraction module 413 can be utilized to extract information from the CBS messages. A CBS message can be received via the communication interface 403 and forwarded to the location extraction module 413 to extract one or more of a CBS message identifier, time information, and date information from the CBS. Moreover, the CellID of the cell tower 103 transmitting the CBS message can be determined by the UE 101 and associated with the CBS message identifier, time information, and date information. Additionally or alternatively, the time information and/or date information may be determined based on UE 101 information and need not be extracted from the CBS message.

The information can be stored in the memory 409. Further, the execution module 405 can additionally store additional location information (e.g., GPS coordinates) corresponding to the extracted data in the memory 409. The execution module 405 can determine a time to send the collected information to a location services platform 111. The time can be determined based a time period, a threshold amount of information being collected, or an event (e.g., a change in the CBS message identifier or CellID). Moreover, the location extraction module 413 may associate location information collected from the location module 407 to areas (e.g., via CellID, GPS coordinates, or CBS message identifier names).

In one embodiment, a UE 101 includes a user interface 411. The user interface 411 can include various methods of communication. For example, the user interface 411 can have outputs including a visual component (e.g., a screen), an audio component, a physical component (e.g., vibrations), and other methods of communication. User inputs can include a touch-screen interface, a scroll-and-click interface, a button interface, etc. In one embodiment, a user can input a request to upload or receive object information via the user interface 411. The user interface 411 may be used to receive a location based query from a user and present a response to the query to the user. The execution module 405 may run a location application 109 that can locally determine the response based on a local CBS information database 117, which can be stored in the UE memory 409. Moreover, in one embodiment, the user interface 411 may be used to determine settings to collect and transmit location data and CBS message information to a location services platform 111. Further, the user interface 411 may be utilized to receive POI information up update a connectivity graph stored in the local CBS information database 117 and to update a connectivity graph on the location services platform 111. In certain embodiments, the user interface 411 may additionally have a vocal user interface component. As such, a text-to-speech mechanism may be utilized to provide textual information to the user. Further, a speech-to-text mechanism may be utilized to receive vocal input and convert the vocal input into textual input. In this way, location based queries may be structured using the vocal input (e.g., using the vocal input as a search term). Further, in certain embodiments, vocal output may be utilized as an interactive voice response. A user (e.g., an illiterate user or a user who prefers to interact using voice) may then, for instance, receive vocal questions and information and input responses using speech-to-text conversion.

Figure 5:
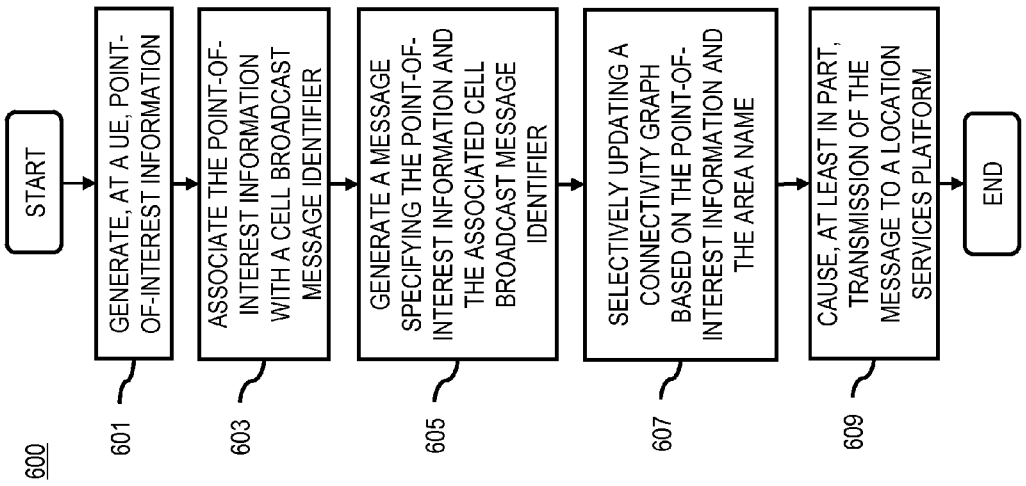
FIG. 5 is a flowchart of a process for generating a connectivity graph for providing location based services, according to one embodiment.

FIG. 5 is a flowchart of a process for generating a connectivity graph for providing location based services, according to one embodiment. In one embodiment, the runtime module 305 performs the process 500 and is implemented in, for instance, a chip set including a processor and a memory as shown FIG. 10. A location services platform 111 may be used to collect CBS message information from UEs 101, analyze the CBS message information to create a connectivity graph, and use the connectivity graph to provide location based services. Further, the connectivity graph may be downloaded or otherwise transferred (e.g., as part of a location application 109) to a UE 101 to allow for local location based services use. Moreover, the connectivity graph may include POI information associated with cells (areas) of the connectivity graph.

At step 501, the runtime module 305 is caused, at least in part, to receive a plurality of CBS message identifiers from UEs 101. CBS message identifiers can be received as part of a message from one of the UEs 101. The message may also include other associated information, such as a CellID, a time, a date, and/or GPS coordinates. The identifiers can be received from the UE 101 via a communication system, such as GPRS, MMS, SMS, Internet, etc. If the identifiers are received via a communication system associated with a telephony network for example, the received messages can be sorted via a port number or a phone number. Moreover, the collected data can be associated with a UE 101 via an identification of a phone number associated with the UE 101. In some embodiments, identification information may be stripped from the message before the information is stored in a database to protect user privacy. In other embodiments, information from a user can be correlated to determine a path of the user. The path can include travel from one cell to another cell as described in the discussion of FIG. 2. Moreover, the path of users during certain time periods or between certain events (e.g., staying in one place for longer than a threshold period of time) can additionally be stored. This information can be used to determine frequency of traveled paths.

At step 503, the CBS message identifiers can be respectfully associated with a plurality of cells. The cells may be associated with different networks. Some of the received messages can include both CBS message identifiers and CellIDs. This information can be stored in a CBS information database 113 to create a CBS message identifier and CellID lookup table. This mapping of CBS message identifiers to CellIDs allows the location services platform 111 to provide CBS message identifiers, which refer to area names, to users on UEs 101 of locations. This CBS message identifier and CellID lookup table can be beneficial because some UEs 101 may not have the capability to receive CBS messages. In this case, the CellID can be used to determine a CBS message identifier. Additionally, the CBS message identifiers received can be analyzed to ensure that the CBS message identifiers provide a description of an area.

Under some scenarios, the CBS message identifier field of a CBS message can include an advertisement. Under this scenario, advertisements can be filtered out. Advertisements can be determined based on one or more rules. One such rule can include determining if the CBS message identifier field includes numbers. Generally, a descriptive location of a CBS message identifier need not include numbers, but advertisements on UEs 101 may include phone numbers to call. Moreover, more than one CBS message identifier may be associated with a CellID. This can occur if more than one service providers use the same cell tower 103. Each may have different identifiers in the CBS message identifier field. During the data aggregation process, a primary CBS message identifier can be determined based on the number of times the CellID of the cell is associated with the CBS message identifier.

Then, at step 505, the runtime module 305 can generate a connectivity graph specifying relationships among the cells. The runtime module 305 can generate the connectivity graph based on the CBS message identifier and CellID lookup table as well as paths observed of one or more UEs 101. As described in the discussion of FIG. 2, the path of a user can be used to associate connectivity of cells. Moreover, the path of a user can be stored to determine which paths are frequently taken by users. This information can help determine traffic patterns, such as which path is most commonly taken by users from a starting point to a destination point. Moreover, time can be associated with the path so that the runtime module 305 can determine traffic patterns of commonly used paths during times of day (e.g., during rush hour). A cell is connected to another cell if it is observed that a user has moved from one cell to the other cell. The information collected in the messages can be filtered to more accurately determine if a UE 101 actually moved from one cell to the other cell. This filtering can be done based on requiring a threshold amount of matching sample sets of information before marking a transition. The filtering may be used to ensure that a momentary connection by the UE 101 to a cell tower 103 need not lead to an associated connection between the two cells. Filtering can be accomplished on the location services platform 111 or UEs 101.

Moreover, the connectivity graph can be associated with distance or time elements to determine a proximity graph. In a proximity graph, the edges between two cells can have a distance element, a time element, a weight element, or a frequency element associated with it. Thus, a first cell and a second cell can have an associated distance stored in the CBS information database 113. As discussed previously, the distance can be determined by determining a centroid of the first cell and the second cell based on received messages and determining a distance from the center of each cell. As additional information can be collected dynamically, the centroid of the cells can change over a period of time. The connectivity graph, CBS message identifier to CellID lookup table, and proximity graph can then be used in conjunction with POI information as further described in FIG. 6 to provide location based services to UEs 101.

Moreover, once enough data is collected to generate connectivity graphs and associated POI information, the location services platform 111 or another computing device may compile local CBS information databases 117 that may be associated with location applications 109 to install on UEs 101. These local CBS information databases 117 may be updated by sending and receiving messages to the location services platform 111 or by connecting to a computing device (e.g., a kiosk). For example, kiosks may be placed in hotels or grocery stores to offer updates to users of UEs 101. In certain embodiments, a fee or charge may be assigned to retrieving updates from kiosks. Further, these updates may include updating the entire CBS information database 117 or particular parts of the CBS information database 117 (e.g., based on areas associated with connectivity graphs).

Figure 6:
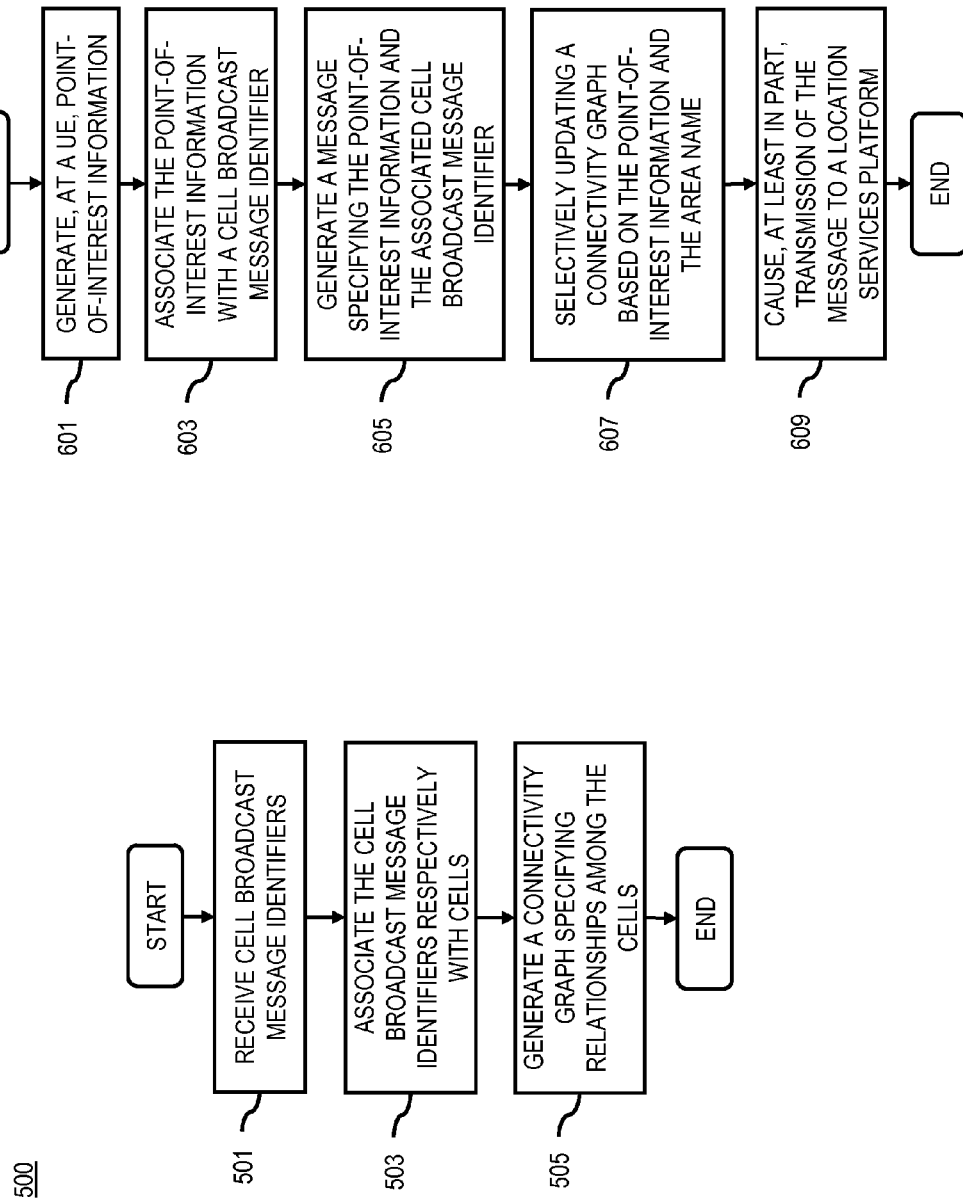
FIGS. 6 and 7 are flowcharts of processes for updating point-of-interest information associated with cell broadcast information, according to various embodiments.

FIG. 6 is a flowchart of a process for updating point-of-interest information associated with cell broadcast information, according to one embodiment. In one embodiment, the execution module 405 of a UE 101 performs the process 600 and is implemented in, for instance, a chip set including a processor and a memory as shown FIG. 13. In certain embodiments, the location application 109 runs on the execution module 405 and is displayed using a user interface 411 of the UE 101.

In step 601, the execution module 405 generates, at the UE 101, point-of-interest information. In certain embodiments, the information is generated using the user interfaces further detailed in FIG. 10. The POI information may be generated by selecting a location of a POI and entering additional POI information about the POI. As noted above, the POI information may include categories of the POI as well as identifying information (e.g., name, address, phone number, etc.).

Then, at step 603, the execution module 405 associates the POI information with a CBS message identifier. The CBS message identifier can correspond to one of a plurality of cells of a communication network 105. Further, the CBS message identifier can include an area name. In certain embodiments, the cell broadcast message identifier is selected based on user input as further detailed in FIG. 10. In other embodiments, the CBS message identifier is selected based on a current location of the UE 101. In this manner, the user can go to the POI and utilize the location application 109 to add information about the POI. The location of the POI can be automatically determined based on the corresponding CBS message identifier captured while generating the POI information. To simplify the process for the user, one or more steps of selecting POI information to associate with the POI may be categorically selected. Moreover, to add additional flexibility for the user, portions of the POI information (e.g., POI name, POI address, etc.) may be entered as textual input. At step 605, the execution module 405 generates a message specifying the POI information and the associated CBS message identifier and/or associated area name. The message may be utilized by a location services platform 111 to selectively update a connectivity graph associated with the POI.

Further, a connectivity graph locally available on the UE 101 can be selectively updated based on the POI information and the CBS message identifier and/or area name (step 607). The execution module 405 can retrieve a data structure associated with a cell of the connectivity graph from a local CBS information database 117. The cell may correspond to the CBS message identifier and/or area name. In certain embodiments, the data structure includes a CBS message identifier that can signify an area associated with the cell in the connectivity graph, a CellID, POIs associated with the cell, an update timestamp or version of the last update of the data structure, or a combination thereof. Further, each of the POIs in the data structure may include POI information. The execution module 405 can search the POIs to determine if the updated POI information is associated with one of the POIs (e.g., due to a match in name and/or address or phone number). If the POI information is matched, the user may select to update a portion of the POI information. Otherwise, if the POI is new to the connectivity graph, the execution module 405 create a new data structure for the POI and adds the data structure to the POIs associated with the cell.

Then, at step 609, the execution module 405 may cause, at least in part, transmission of the message to the location services platform 111. The location services platform 111 may then be able to update its connectivity graphs with the updated POI information. Further, the transmission may be transmitted using an SMS message, an MMS message, a GPRS communication, and/or other similar modes of communication. By way of example, it is noted that in certain areas, SMS and MMS messages are more commonly used that other forms of information transmissions, thereby increasing the availability of the location application 109 to more UEs 101 in those areas. Further, SMS and MMS messages generally require less power to transfer information to the location services platform 111 to other transmission methods. However, it is contemplated that the approach described herein is not limited to SMS or MMS messaging and is applicable to any other method of information transmission (e.g., GPRS, etc.).

Figure 7:
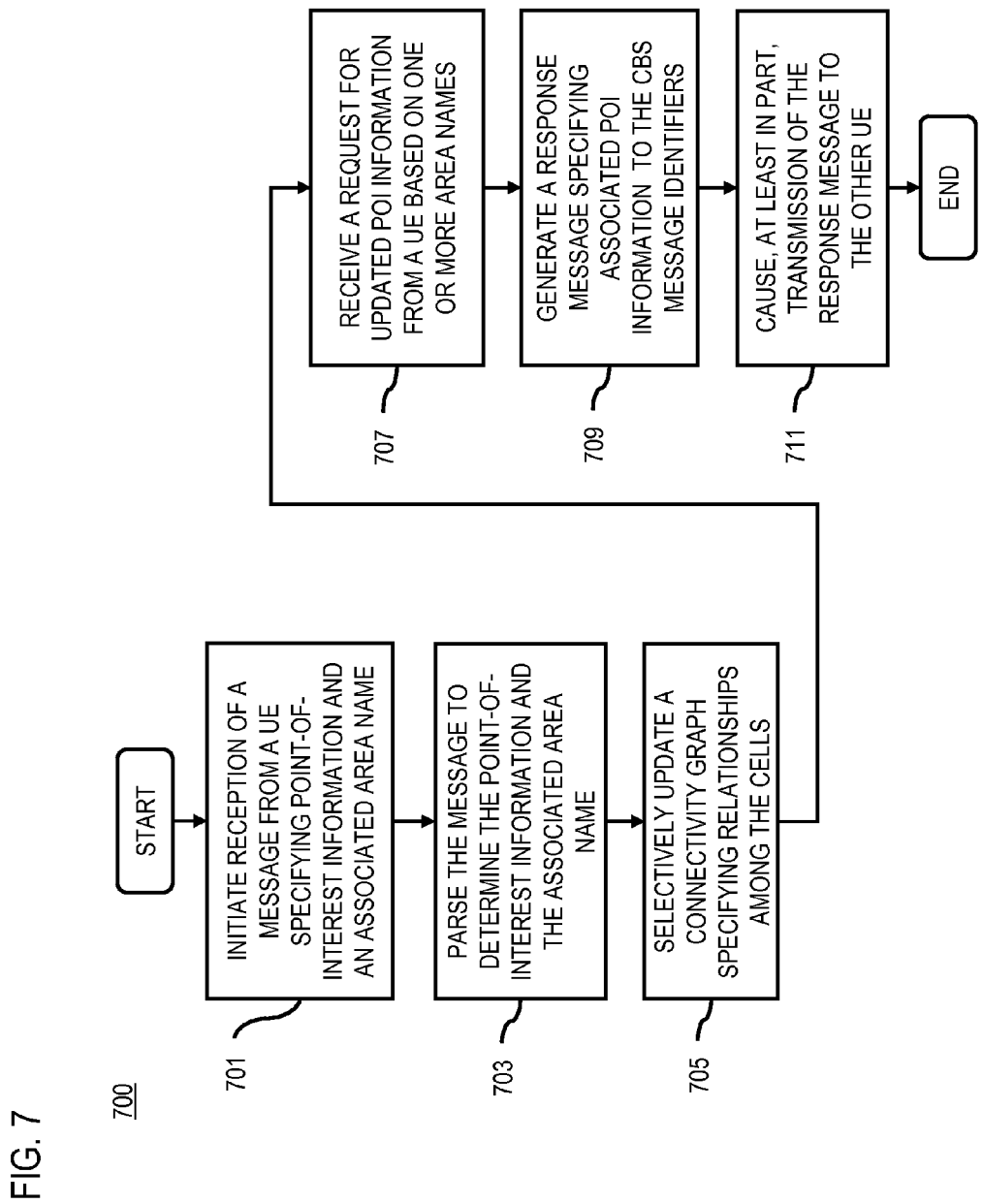

FIG. 7 is a flowchart of a process for updating point-of-interest information associated with cell broadcast information, according to one embodiment. In one embodiment, the runtime module 305 of a location services platform 111 performs the process 700 and is implemented in, for instance, a chip set including a processor and a memory as shown FIG. 13. The location services platform 111 may provide location based services to UEs 101 utilizing stored connectivity graphs with cells associated with POI information. Further, according to the process 700, the connectivity graphs may be updated with additional POI information and may be utilized to provide information updates of POI information to UEs 101.

In step 701, the runtime module 305 causes, at least in part, reception of a message from a UE 101 (e.g., a mobile terminal). The message can specify POI information and an associated CBS message identifier and/or an area name corresponding to one of a plurality of cells of a communication network 105. In certain embodiments, the CBS message identifier includes the area name. The cells may be associated using relationships based on a connectivity graph. The message may be a formatted message (e.g., an SMS message, MMS message, GPRS communication, and the like) that includes the CBS message identifier and the POI information as described above. In certain embodiments, the message may be formatted in a manner that may be parsed by the runtime module 305. For example, the message may be formulated in a structured data structure including place for the CBS message identifier and a data structure for the POI information.

Then, at step 703, the runtime module 305 parses the message to determine the POI information and the associated CBS message identifier and/or area name. The parsed message can be stored in a memory 309 of the location services platform 111. Further, the runtime module 305 can selectively update a connectivity graph specifying relationships among the cells based on the POI information and associated CBS message identifier (step 705). The runtime module 305 retrieves information from a connectivity graph associated with a cell based on the CBS message identifier and/or area name. The cell may include information associated with POIs. This information is compared with the parsed POI information and to determine if the POI information is associated with an existing POI. If the parsed POI information is unassociated with the cell and/or is new to the connectivity graph, then the POI information can be added as a new POI associated with the cell. If the parsed POI information is already associated with the cell, then the runtime module 305 may prompt (e.g., via a user interface, a message to a UE 101, etc.) a user to determine whether the parsed POI information should be added, appended, or be discarded. As such, the runtime module 305 can be means for determining that the POI information is associated with a POI new to the connectivity graph. The runtime module 305 may then receive further instructions as to how to implement use of the parsed POI information. Additionally or alternatively, the parsed POI information may be used to update the information associated with the POI. In one scenario, the message may have an identifier associated with a password or pass code that is associated with the POI associated with the cell. Then, the runtime module 305 can determine that if the message contains the pass code, the message has privileges to update the information associated with the POI in the CBS information database 113. Further, the runtime module 305 stores the updated connectivity graph in the CBS information database 113. The updated POI information associated with the cell may further include a version number or an update time stamp to determine update status information about the POI information.

Next, at step 707, the runtime module 305, via a communication interface 301, receives a request for updated POI information from a UE 101 based on one or more CBS message identifiers and/or area names. In certain embodiments, the request is a message requesting an update for an area associated with the CBS message identifier. The message may further include a version identifier or timestamp of the last time the UE 101 received an update associated with the area and/or CBS message identifier. The runtime module 305 then retrieves cell information associated with the area based on the CBS message identifier from a connectivity graph. Then the cell information is parsed into portions of POI information. As such, each of the POIs associated with POI information may include a timestamp or version identifier. In one embodiment, if the version number or timestamp of the POI is more recent than the version identifier or timestamp of the UE 101, the POI information associated with the POI is included in update information to transmit to the UE 101. Thus, the runtime module 305 can be utilized as means for determining update information, including POI information. In other embodiments, the update information includes all of the POI information associated with the area. Then, at step 709, the runtime module 305 generates a response message specifying the update information. Next, the runtime module 305 causes, at least in part, transmission of the response message to the UE 101. Thus, the runtime module 305 can be means for determining to cause and causing, at least in part, transmission of the response message to the UE 101.

In one embodiment, the location services platform 111 may be utilized to provide physical services to the user. A physical service may be a service that can be tangibly provided to the user. For example, the physical service may be ordering of a taxi or a cab, or the delivery of items (e.g., food such as fast food, ethnic food, or pizza). As such, the runtime module 305 can receive a request for the location based service from a UE 101. Thus, the runtime module 305 can include means for causing, at least in part, reception of a request from another mobile terminal specifying a physical service, the POI information including a POI identifier (e.g., a name of the POI), and the associated area name. The UE 101 can specify the request in a message (e.g., an SMS or MMS message) and can include a location of the user. In certain embodiments, the location includes a CBS message identifier that can be used to determine an area name. In other embodiments, the location can include the CBS message identifier and/or POI information associated with the user's location. This may be selected by the user based on a menu of POIs in the current area of the UE 101. Once the runtime module 305 receives the request, the runtime module 305 can associate the message with a service, locate an available physical service provider, and contact the physical service provider to order the physical service for the user. Thus, the runtime module 305 may be means for causing, at least in part, ordering of the physical service to an area associated with the one cell and the POI identifier. In one example, the physical service includes a cab, the runtime module 305 determines a phone number associated with a cab service in the area, and sends a message to the cab service to send a cab to the area (based on the CBS message identifier) nearby the POI. Then, the runtime module 305 can reply to the UE 101 with a status of the physical service (e.g., the cab will be arriving in 5 minutes).

Figure 8:
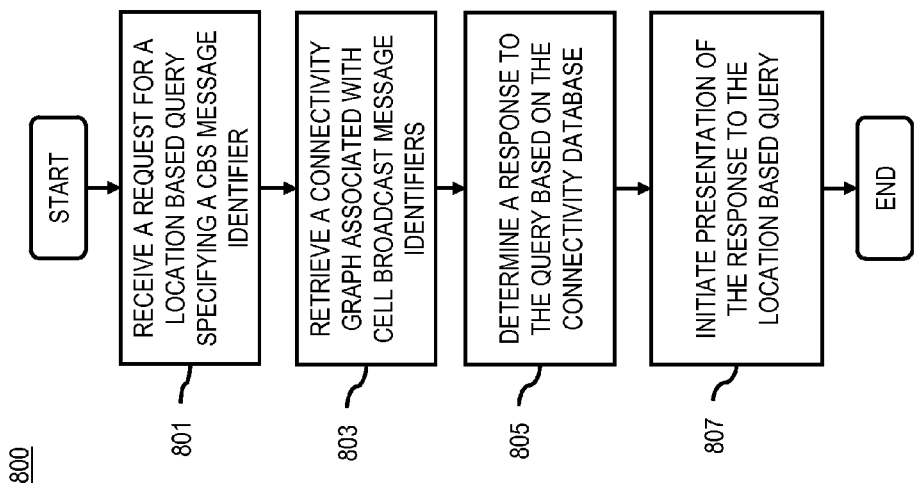
FIG. 8 is a flowchart of a process for providing location based services to a user based on a connectivity graph and cell broadcast message identifiers, according to one embodiment.

FIG. 8 is a flowchart of a process for providing location based services to a user based on a connectivity graph and cell broadcast message identifiers, according to one embodiment. In one embodiment, the execution module 405 performs the process 800 and is implemented in, for instance, a chip set including a processor and a memory as shown FIG. 13. In certain embodiments, portions of the process 800 may be executed on a location services platform 111 and provided to the UE 101.

Figure 11:
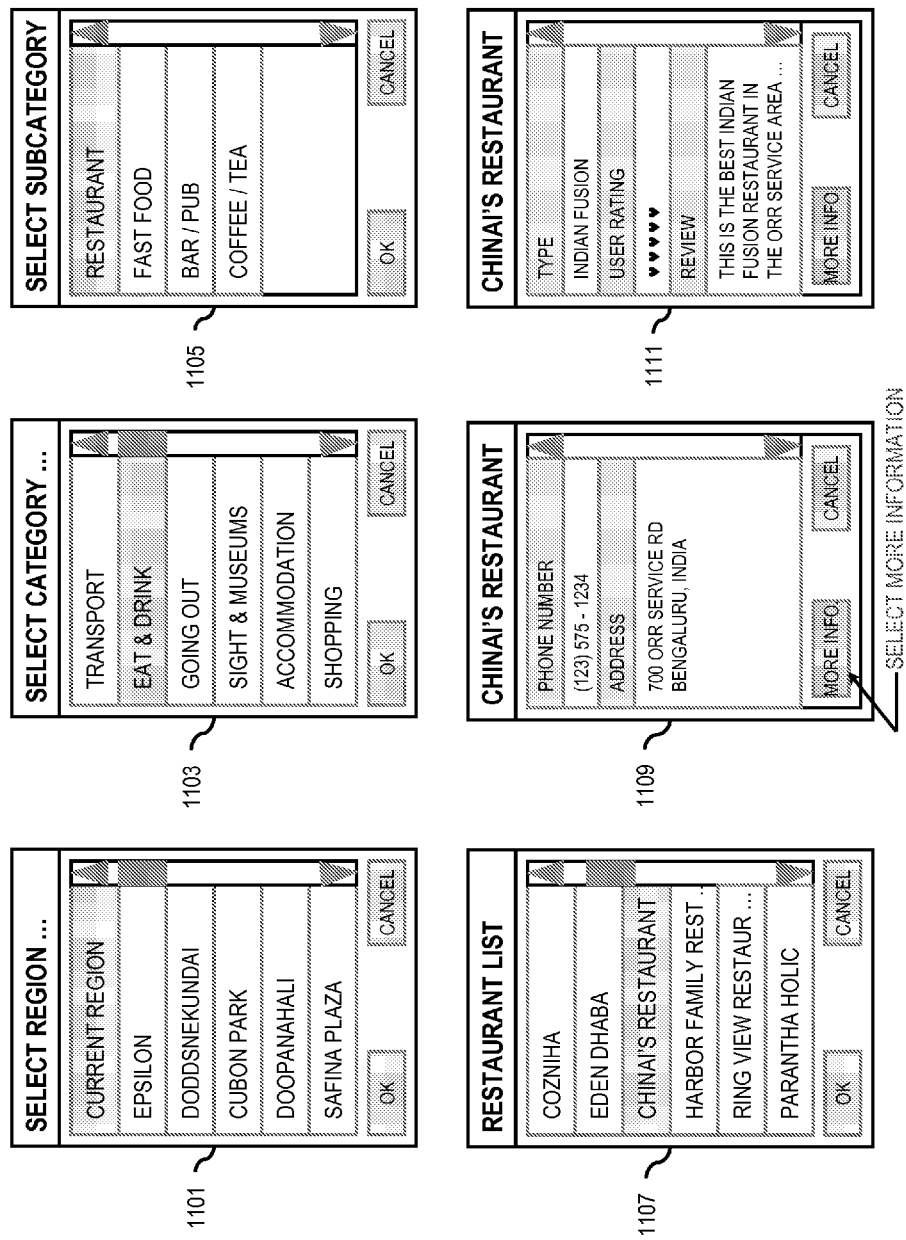

At step 801, the execution module 405 can be caused to, at least in part, receive a location based query from via a user interface 411. The query may specify cell information such as a CellID or a CBS message identifier. FIG. 11 details an example of specifying the cell information for use in a location based query. This cell information can represent a current location of the UE 101. The query may also include query information describing the type of query and query parameters. In one embodiment, the query is a request for directions to a destination POI. The destination POI is an example of a query parameter. In another embodiment, the query may be a city guide or a request for a local search of POIs and the name of the POI or the type of POI may be a query parameter. Additionally, the query can have an area parameter describing the area to search; the area can be represented based on cell relationships. A connectivity graph associated with CBS message identifiers and POI information is then retrieved. The connectivity graph is parsed to retrieve information associated with cell information based on the CBS message identifier (step 803).

Next, at step 805, a response to the query is determined based on the CBS message identifier and the connectivity graph or proximity graph. The query is associated with one of the cells in the connectivity graph based on the cell information. A response to the query is then generated based on the query parameters and the connectivity graph and/or proximity graph.

In one embodiment, the query includes a request for directions. In this embodiment, the query includes a specified destination (e.g., a POI). The destination can be mapped onto another one of the cells (e.g., nodes) of the connectivity graph. In one example, the destination can be mapped to the other cell because the destination is specified by a CBS message identifier. Then a path or more than one path through one or more cells from the current location to the destination is determined. Next, the execution module 405 can use the lookup table to determine CBS message identifiers that are associated with the cells on the path. These CBS message identifiers may include area names of the respective cells on the path. The determined response may also include the CBS message identifiers (e.g., area names) associated with traversing the path. Further, the areas of the connectivity graph may include POI information associated with one or more POIs. The POIs may be utilized to additionally provide guidance.

In another embodiment, the query includes a request for a local search of points-of-interest. The query may specify cell information such as a CBS message identifier as well as search information. The search information can include an area parameter selecting a range of how far to conduct the search from the user's current or recent location. This area parameter is used to select cells on the proximity graph or connectivity graph that correspond to the area as search locations. For example, the user may select an area of the user's current location as well as neighboring cells. Moreover, a location search database may be created using the connectivity graph by including local search information (e.g., POI, POI types, etc.) associated with each CBS message identifier or CellID. This database can be generated by associating the GPS coordinates of POIs to cells or by updating the database from a CBS information database 113 associated with a location services platform 111. For example, the database may include names of restaurants in an area encompassed by a first cell. The local search is then conducted using a search parameter (e.g., a POI type or POI name). Once one or more POI search results are determined, the POI can be associated with a cell on the connectivity graph. The cell can be associated with a CBS message identifier that may include an area name. The POI, POI information, and the area name and/or CBS message identifier can be included in the search result. The local search result can be part of the response. Then, the execution module 405 causes, at least in part, presentation of the response to the user (step 807).

In one embodiment, the query includes a request for physical services to the user. For example, as noted above, the physical service may be ordering of a taxi or a cab, or the delivery of items (e.g., food such as fast food, ethnic food, or pizza). The execution module 405 may receive the request via input from the user. The user may be prompted by the user interface 411 to provide the location of the user. As such, the user may choose from an area based on a CBS message identifier. The area may be the current area of the UE 101 determined by the UE 101. Then, the user may be presented with options of POIs in the area to choose from. Various filters (e.g., a category filter, a POI type filter, etc.) may be utilized by the UE 101 to present the POIs. Further, the user may select the POI by entering text via the user interface 411 to specify the POI. Then, the execution module 405 generates a message to request the physical services. The message may specify an identifier of the user (e.g., a name, phone number, etc.), a CBS message identifier to specify an area, ordering information (e.g., "I would like a large cheese pizza" or "I would like a 7 passenger cab") and a POI associated with the area to use as a landmark to provide guidance to the physical service provider. Then the execution module 405 can cause, at least in part, transmission of the message to a location services platform 111 to request the physical service. The UE 101 may later receive confirmation of the reception of the request and status information associated with the request.

Figure 9:
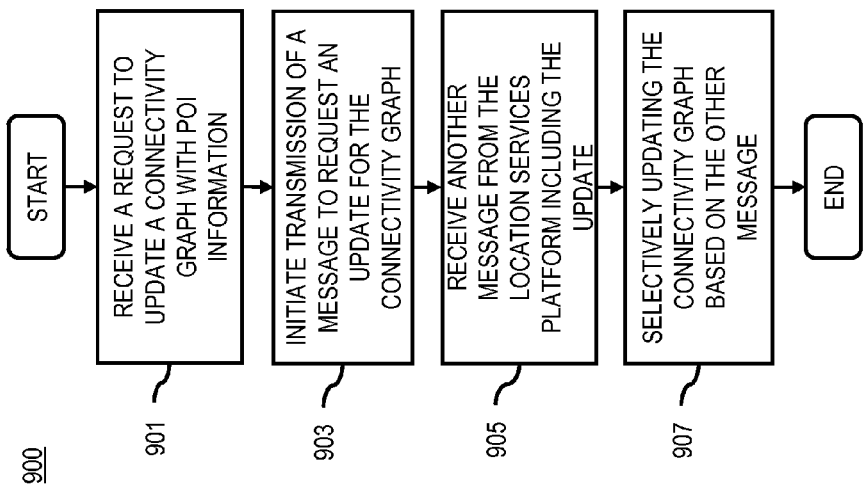
FIG. 9 is a flowchart of a process for updating a connectivity graph on user equipment, according to one embodiment.

FIG. 9 is a flowchart of a process for updating a connectivity graph on user equipment, according to one embodiment. In one embodiment, the execution module 405 performs the process 900 and is implemented in, for instance, a chip set including a processor and a memory as shown FIG. 13. In step 901, the execution module 405 receives a request to update a connectivity graph with additional POI information. This request may be received via a user interface 411 of the UE 101. Further, the request may specify one or more CBS message identifiers associated with areas of the connectivity graph to update. In certain embodiments, this request is prompted by the execution module 405 while determining a response to a location based query (e.g., during the process 800 of FIG. 8).

The execution module 405 can cause, at least in part, transmission of a message to request an update for the connectivity graph to a location services platform 111 (step 903). As noted previously, the message can be a MMS message, a SMS message, or another message type over a communication network 105. Further, the message may include a CBS message identifier to determine an area associated with the connectivity graph as well as a version identifier, timestamp, or other means for determining whether the connectivity graph needs updating. Then, at step 905, the execution module 405 receives another message from the location services platform 111, the message including update information. The location services platform 111 may determine the update information using the processes of FIG. 7. Then, at step 907, the execution module 405 can selectively update the local connectivity graph based on the update information. As noted in the discussion of FIG. 7, the update information may include a replacement set of data to replace the POI information associated with the area. Alternatively or additionally, the update information may include new and updated POI information to modify the current set of POI information associated with the area.

Figure 10:
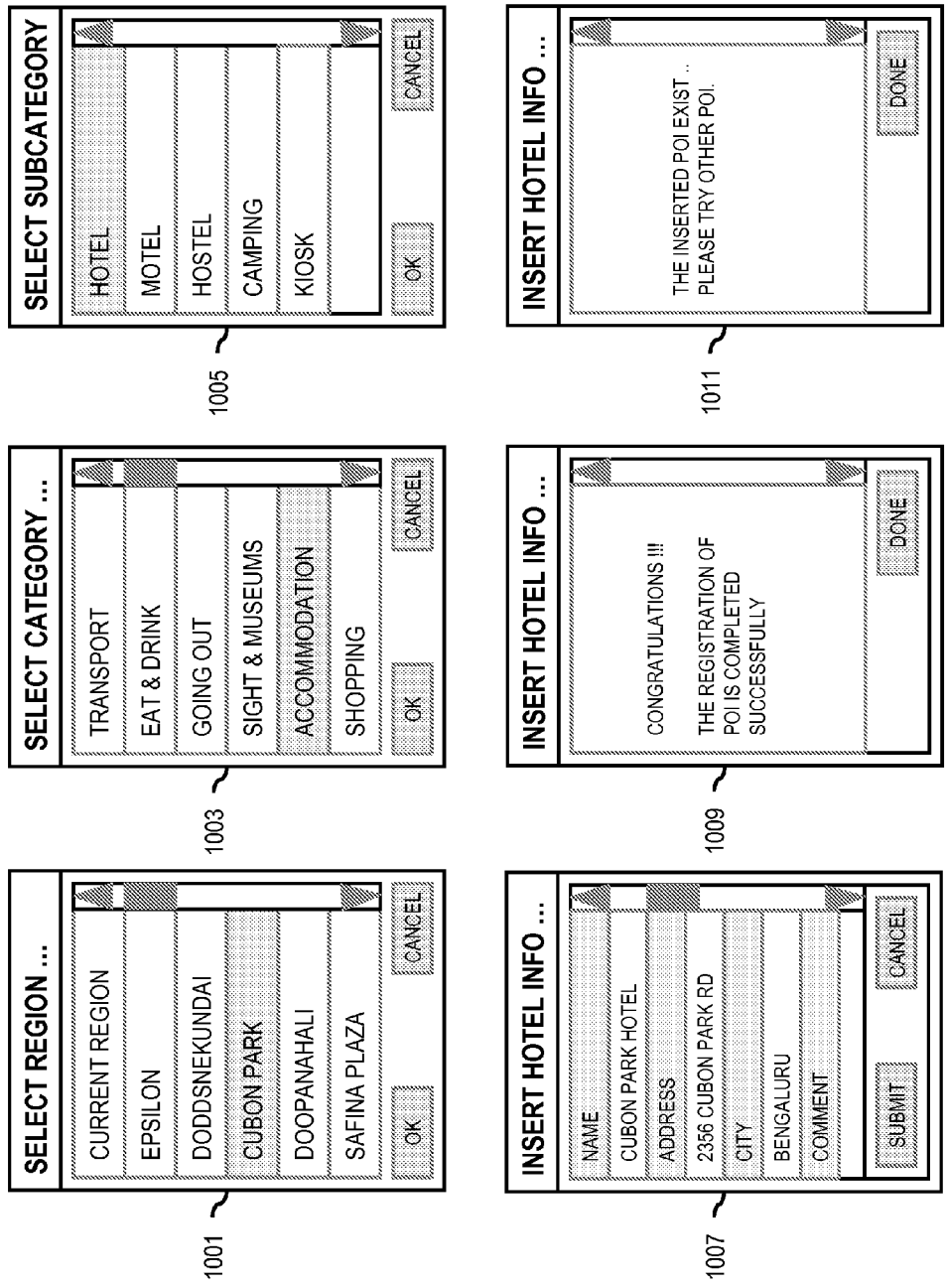
FIGS. 10-11 are diagrams of user interfaces utilized in the processes of FIGS. 5-9, according to various embodiments.

FIG. 10 is a diagram of user interfaces utilized in the processes of FIGS. 5-9, according to various embodiments. User interfaces 1001, 1003, 1005, 1007, 1009, 1011 may be utilized to collect POI information to update connectivity graphs on a UE 101 as well as on a location services platform 111. In one example, the user may have recently opened a hotel in Cubon Park and may want to advertise this information. Cubon Park may be an area name associated with a CBS message identifier. Alternatively or additionally, Cubon Park may be a modified area name associated with the CBS message identifier (e.g., the CBS message identifier area name may include "Cubon Pk.," which translates into Cubon Park). Creating a website or providing advertisement in the paper may be expensive options for the user. Further, many people in emerging economies are less Internet savvy and do not use the Internet for searching for things, meaning that there would be less advertisement exposure. The user may utilize a location application 109 of the UE 101 to update POI information associated with the location services platform 111 with the user's hotel. As such, the user need only bear the cost of transmission (e.g., a SMS or MMS).

According to FIG. 10, the user may select a region for a POI at user interface 1001. Then, the user may be prompted, at user interface 1003, to select a category (e.g., accommodation) for the POI. The user then selects the subcategory of hotel at user interface 1005. At this point, the UE 101 knows that the POI is a hotel in Cubon Park. Next at user interface 1007, the user enters POI information associated with the hotel (e.g., name, address, etc.). Further, the user may enter additional information, such a comments, pictures, etc. Moreover, the user may be prompted to select other POIs or landmarks nearby the POI to provide more refined grouping information about which POIs are nearby which POIs and landmarks. Further, the user may provide vocal or speech input to the UE 101 that may be converted to text using a speech-to-text mechanism to submit the information. This information may be transmitted to the location services platform 111 for updating a connectivity graph with the POI information. Then, the user may receive a message from the location services platform 111 presented on the user interface 1009 a successful registration notification. Alternatively, the user interface 1011 may present an unsuccessful registration notification. Upon successful registration, when another UE 101 queries the location services platform 111 for information about the area of Cubon Park, the new POI information may be received and utilized by the UE 101 of the other user. In certain embodiments, when portions of the interface are highlighted and/or selected (e.g., Cubon Park), audio associated with the portion (e.g., a name) may be presented to the user. In this manner, a user who cannot or prefers not to use text-based interaction (e.g., an illiterate user or a user who cannot view text because of environmental conditions) may be able to navigate the user interface to add POI information.

Moreover, other users (e.g., a local person, a tourist, etc.) interested in a POI may update the POI information. For example, if the user utilizes a location based service on the user's UE 101 and notices that a POI is not mentioned, the user may use the processes of FIGS. 6, 7, and 9 to update a connectivity graph of the location services platform 111 or the user's UE 101 with the information. Further, users may additionally add ratings for the POIs, which may be utilized to search for POIs. Additionally, the user may be provided with incentives from the location services platform 111 to provide updates. These incentives may include monetary gain, credits for services from the location services platform 111, credits for sending messages, etc. or a combination thereof.

FIG. 11 is a diagram of user interfaces utilized in the processes of FIGS. 5-9, according to various embodiments. User interfaces 1101, 1103, 1105, 1107, 1109, 1111 may be utilized to provide information to a user of a UE 101 about POIs. In one embodiment, the user is new to a city (e.g., a tourist), and would like to know the restaurants near the user's hotel. The user can initiate a location application 109 from the user's hotel room and utilize the location application to find restaurants. In this embodiment, the user may have a UE 101 that is not capable of receiving GPS signals or use GPRS connectivity. Location application 109 detects the capabilities of the UE 101 and captures a CellID and CBS message identifier associated with the UE 101. From the CellID or the CBS message identifier, location application may capture captures the area "Current Region" displayed in user interface 1101. Further, the UE 101 may retrieve a connectivity graph from a local CBS information database 117 and determine areas nearby to the user's location to allow the user to select these areas (e.g., Epsilon, Cubon Park, etc.) for finding the restaurant. In certain embodiments, the user may enter text describing the restaurant or may select an option to retrieve information about the restaurant using menus. In user interface 1103, the user selects an "eat and drink" category, which allows for the user to select restaurants in a subcategory user interface 1105. Then, a list of restaurants associated with the area (e.g., an area associated with a cell of the connectivity graph) is presented to the user on a restaurant list user interface 1107. The user can browse the list, choose a particular restaurant (e.g., Chinai's Restaurant), and information such as address, phone number, restaurant type and ratings is presented to the user in user interface 1109. Further, additional information such as specialties of the restaurant or user ratings and/or review may be presented on user interface 1111 if the user selects to view additional information. As noted above, the user interfaces 1101-1111 may be presented to the user via a vocal interface (e.g., using a text-to-speech and speech-to-text means).

If the user wants a narrower search, the user can select a zoom function. This function would then extract the landmarks or POIs in the current area or another selected area. The user can select the landmark or POI that the user is close to. For instance, if the user knows that the user is close to a cinema theatre "Z", the user could select that POI and the location application 109 can perform a refined query to find all the restaurants near cinema theatre "Z". In this scenario, each POI may include in its POI information, specific POIs and/or landmarks that the POI is nearby. Thus, a more refined search can be provided by grouping certain POIs together within the areas of the connectivity graph. Further, if the search provides inadequate results, the location application 109 may request updates from the location services platform 111 as described above or may broaden the search area.

With the above approaches, users of UEs 101 are provided with location based services based on POI information associated with areas of a connectivity graph identified by CBS message identifiers. In this manner, the UE 101 need not use power consuming GPS location determination technology to receive the location based services, thus saving power and extending battery life in a mobile UE 101. Moreover, because the connectivity graph may be local to the UE 101, the UE 101 need not use GPRS services to receive the location based services. As such, the UE 101 need not have or utilize the capabilities of GPS or GPRS to provide the location based services. Further, the connectivity graph need not utilize mapping information, thus the UE 101 can save memory resources while providing the location based services because the UE 101 need not load map images. Additionally, because the search experience adheres to current practices, there is little change in user behavior to utilize the location application 109. However, in embodiments where GPRS services, SMS or MMS or other wireless network connectivity is available, the connectivity graph and location services may be provided by the location services platform 111. In this way, the processing and resource burden associated with providing such location services can be shifted from the UE 101 to the platform 111, thereby reducing processing power and memory resources used at the UE 101 to support the location based services.

The processes described herein for providing crowd sourcing and grouping points-of-interest based on cell broadcast message information may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
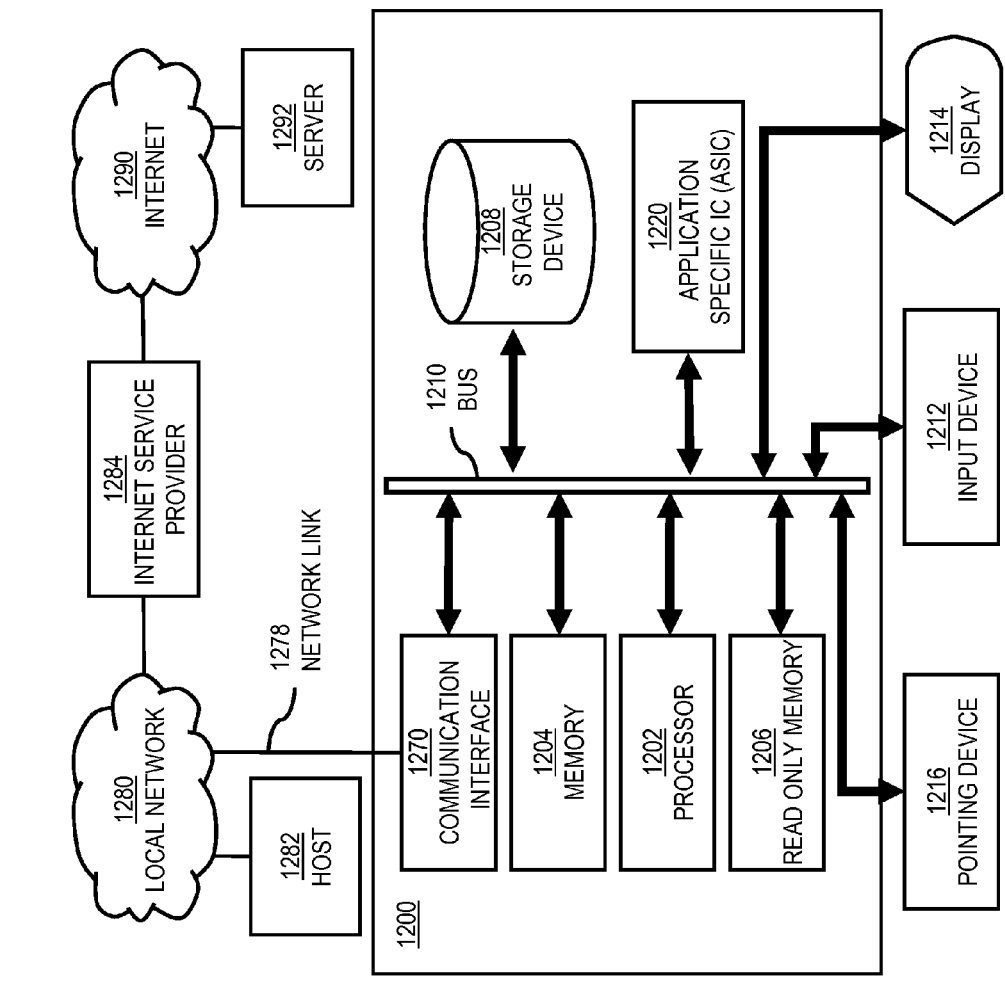
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to provide crowd sourcing and grouping points-of-interest based on cell broadcast message information as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of crowd sourcing and grouping points-of-interest based on cell broadcast message information.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to crowd sourcing and grouping points-of-interest based on cell broadcast message information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for crowd sourcing and grouping points-of-interest based on cell broadcast message information. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for crowd sourcing and grouping points-of-interest based on cell broadcast message information, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for the UE 101.

The term "computer-readable medium" as used herein to refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
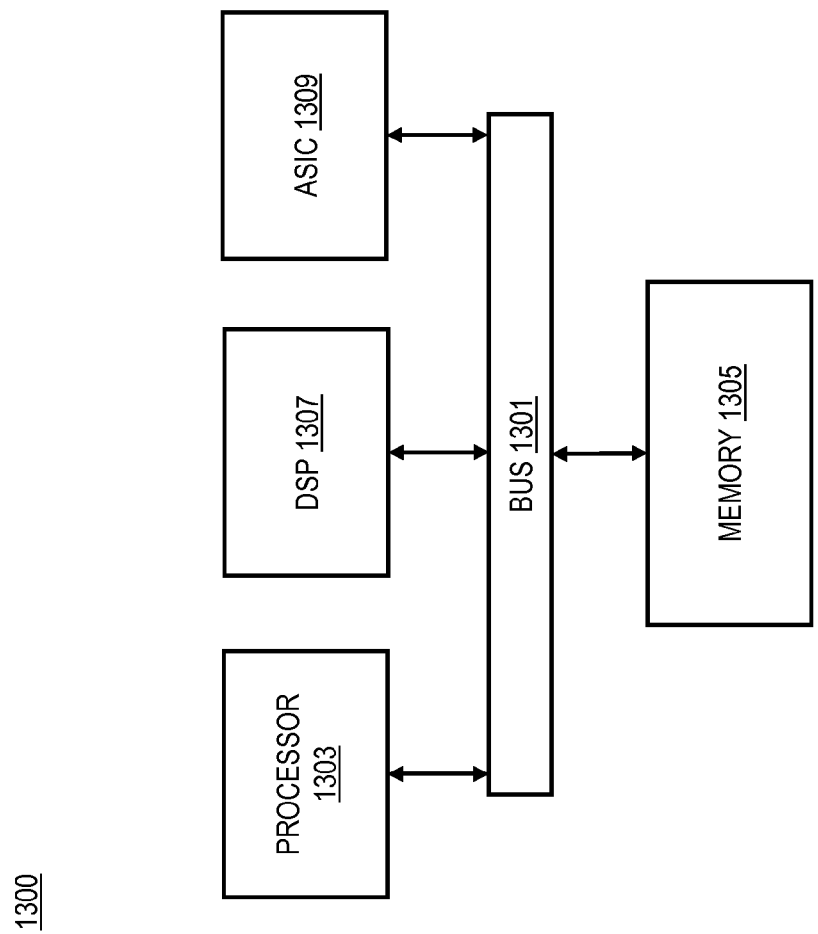
FIG. 13 is a diagram of a chip set that can be used to implement an embodiment of the invention.

FIG. 13 illustrates a chip set 1300 upon which an embodiment of the invention may be implemented. Chip set 1300 is programmed to crowd source and group points-of-interest based on cell broadcast message information as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of crowd sourcing and grouping points-of-interest based on cell broadcast message information.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to crowd source and group points-of-interest based on cell broadcast message information. The memory 1305 also stores the data associated with or generated by the execution of the inventive steps.

Figure 14:
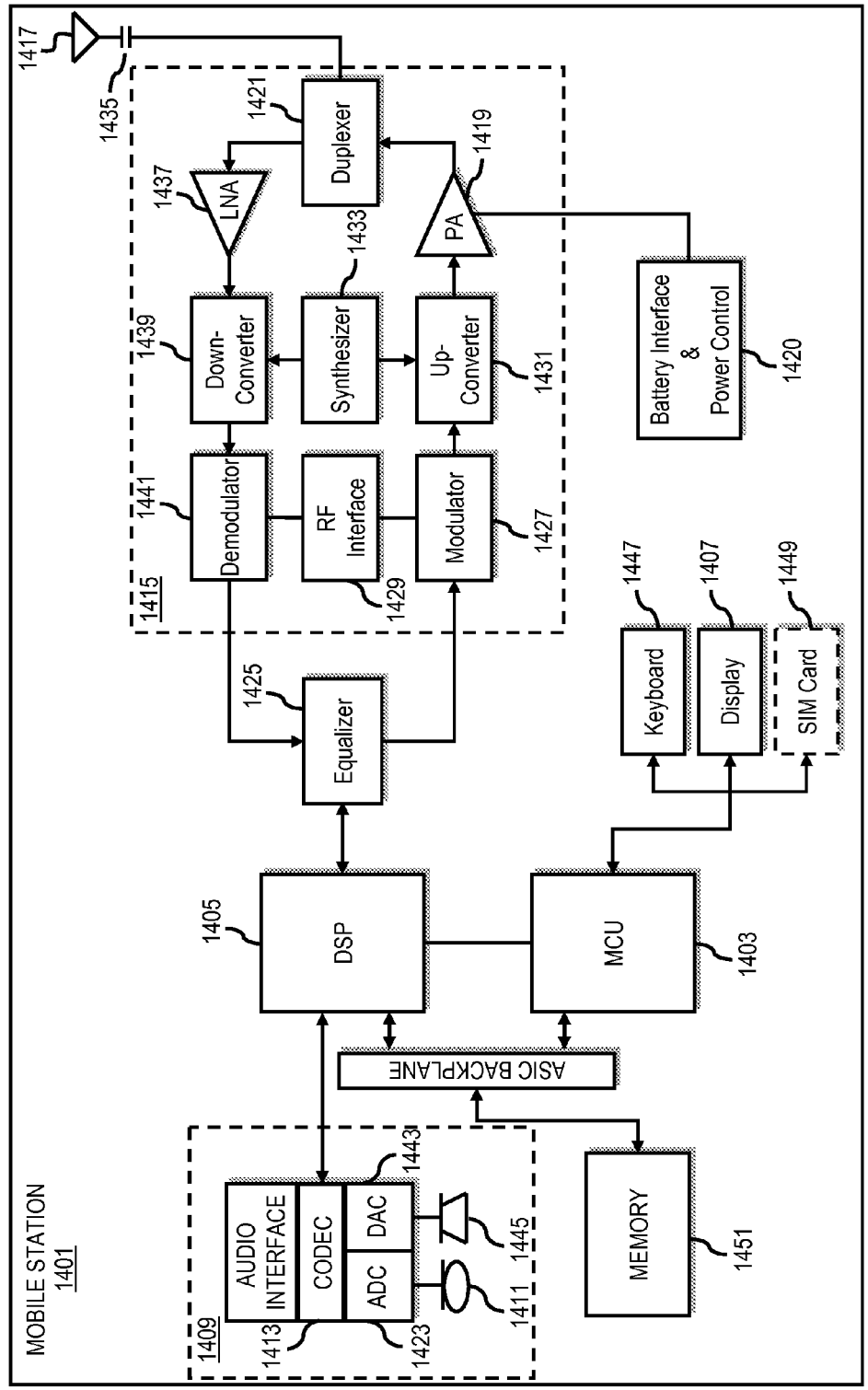
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1400, or a portion thereof, constitutes a means for performing one or more steps of crowd sourcing and grouping points-of-interest based on cell broadcast message information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of crowd sourcing and grouping points-of-interest based on cell broadcast message information. The display 14 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to crowd source and group points-of-interest based on cell broadcast message information. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   generating, at a mobile terminal, point-of-interest information;
   associating the point-of-interest information with a cell broadcast message identifier corresponding to one of a plurality of cells of a communication network, wherein the cell broadcast message identifier includes an area name; and
   generating a message specifying the point-of-interest information and the area name; and
   selectively updating a connectivity graph specifying relationships among the cells based on the point-of-interest information and the area name.

2. A method of claim 1, further comprising:
   receiving an update message specifying an update with additional point-of-interest information, wherein the update message includes a Short Message Service (SMS) message, a Multimedia Messaging Service (MMS) message, General Packet Radio Service (GPRS) communications, or a combination thereof; and
   selectively updating the connectivity graph at the mobile terminal based on the update message.

3. A method of claim 1, further comprising:
   causing, at least in part, transmission of the message to a location platform,
   wherein the message includes a Short Message Service (SMS) message, a Multimedia Messaging Service (MMS) message, General Packet Radio Service (GPRS) communications, or a combination thereof.

4. A method of claim 1, the method further comprising:
   causing, at least in part, presentation of the area name;
   selecting the area name for association with the point-of-interest information;
   causing, at least in part, prompting for the point-of-interest information; and
   receiving input specifying the point-of-interest information.

5. An apparatus comprising:
   at least one processor; and
   at least one memory including computer program code,
   the at least one memory and the computer program code configured to, with the at least one processor, cause the apparatus to perform at least the following,
   generate, at a mobile terminal, point-of-interest information;
   associate the point-of-interest information with a cell broadcast message identifier corresponding to one of a plurality of cells of a communication network, wherein the cell broadcast message identifier includes an area name; and
   generate a message specifying the point-of-interest information and the area name; and
   selectively update a connectivity graph specifying relationships among the cells based on the point-of-interest information and the associated cell broadcast message identifier.

6. An apparatus of claim 5, wherein the apparatus is further caused, at least in part, to:

receive an update message specifying an update with additional point-of-interest information, wherein the update message includes a Short Message Service (SMS) message, a Multimedia Messaging Service (MMS) message, General Packet Radio Service (GPRS) communications, or a combination thereof; and selectively update the connectivity graph at the mobile terminal based on the update message.

7. An apparatus of claim 5, wherein the apparatus is further caused, at least in part, to:

cause, at least in part, transmission of the message to a location platform, wherein the message includes a Short Message Service (SMS) message, a Multimedia Messaging Service (MMS) message, General Packet Radio Service (GPRS) communications, or a combination thereof.

8. An apparatus of claim 5, wherein the apparatus is further caused, at least in part, to:

cause, at least in part, presentation of the area name;

select the area name for association with the point-of-interest information;

cause, at least in part, prompting for the point-of-interest information; and receive input specifying the point-of-interest information.

* * * * *